US010891856B1

(12) United States Patent
Graham et al.

(10) Patent No.: US 10,891,856 B1
(45) Date of Patent: Jan. 12, 2021

(54) TRAFFIC DRONE SYSTEM

(71) Applicant: United Services Automobile Association (USAA), San Antonio, TX (US)

(72) Inventors: Richard Daniel Graham, Plano, TX (US); Bradly Jay Billman, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/393,589

(22) Filed: Dec. 29, 2016

Related U.S. Application Data

(60) Provisional application No. 62/272,930, filed on Dec. 30, 2015.

(51) Int. Cl.
| | |
|---|---|
| G08G 1/16 | (2006.01) |
| H04W 4/00 | (2018.01) |
| G05D 1/00 | (2006.01) |
| B64C 39/00 | (2006.01) |
| G08G 1/09 | (2006.01) |
| G08G 1/095 | (2006.01) |
| G05D 1/02 | (2020.01) |
| H04W 4/029 | (2018.01) |
| H04W 4/40 | (2018.01) |

(52) U.S. Cl.
CPC ............ *G08G 1/09* (2013.01); *G05D 1/0276* (2013.01); *G08G 1/095* (2013.01); *H04W 4/029* (2018.02); *H04W 4/40* (2018.02)

(58) Field of Classification Search
CPC ............ G08G 1/09; G08G 1/095; G08G 1/16; G05D 1/0276; H04W 4/028; H04W 4/046
See application file for complete search history.

(56) References Cited

U.S. PATENT DOCUMENTS

| | | | |
|---|---|---|---|
| 9,070,289 B2* | 6/2015 | Saund ................... G08G 1/054 |
| 9,471,059 B1* | 10/2016 | Wilkins ............... G05D 1/0016 |
| 9,665,094 B1* | 5/2017 | Russell .................. G05D 1/00 |
| 9,832,241 B1* | 11/2017 | Hayward ............... G08G 1/166 |
| 10,008,111 B1* | 6/2018 | Grant ................... G08G 1/0965 |
| 10,654,570 B2* | 5/2020 | Kundu ............ G08G 1/096741 |
| 2013/0141576 A1* | 6/2013 | Lord ........................ G08G 1/04 348/148 |
| 2013/0287261 A1* | 10/2013 | Lee ...................... G08G 1/0145 382/104 |
| 2013/0325325 A1* | 12/2013 | Djugash ............. G01C 21/3415 701/425 |
| 2014/0274012 A1* | 9/2014 | Flick ..................... H04W 4/046 455/418 |

(Continued)

FOREIGN PATENT DOCUMENTS

CN 103377558 A * 10/2013
CN 102436738 B * 3/2014

(Continued)

*Primary Examiner* — Yonel Beaulieu
(74) *Attorney, Agent, or Firm* — BakerHostetler

(57) ABSTRACT

Unmanned vehicles can be terrestrial, aerial, nautical, or multi-mode. Unmanned vehicles may be used to direct vehicle traffic in response to a vehicular accident. For example, an unmanned vehicle may analyze information about the accident scene and based on the information direct traffic near the accident scene.

20 Claims, 4 Drawing Sheets

(56) References Cited

U.S. PATENT DOCUMENTS

| | | | |
|---|---|---|---|
| 2016/0023762 A1* | 1/2016 | Wang | B64F 1/00 |
| | | | 701/3 |
| 2016/0063642 A1* | 3/2016 | Luciani | G06Q 40/08 |
| | | | 705/4 |
| 2016/0275801 A1* | 9/2016 | Kopardekar | G08G 5/0069 |
| 2016/0357183 A1* | 12/2016 | Shaw | G05D 1/0027 |
| 2017/0131717 A1* | 5/2017 | Kugelmass | G05D 1/0088 |
| 2017/0203841 A1* | 7/2017 | Myslinski | B64C 39/024 |
| 2017/0253330 A1* | 9/2017 | Saigh | B64C 39/024 |
| 2018/0346116 A1* | 12/2018 | Kundu | G08G 1/052 |

FOREIGN PATENT DOCUMENTS

| | | | | |
|---|---|---|---|---|
| WO | WO-2014080388 A2 | * | 5/2014 | |
| WO | WO-2016130495 A1 | * | 8/2016 | G01S 19/49 |

\* cited by examiner

TRAFFIC DRONE SYSTEM

CROSS-REFERENCE TO RELATED APPLICATION

The instant application claims the benefit of Provisional Patent Application No. 62/272,930, filed Dec. 30, 2015, entitled "Drone Traffic Cop," in which the contents are incorporated by reference herein in its entirety.

BACKGROUND OF THE INVENTION

Unmanned vehicles (e.g., unmanned aerial vehicles) are known for their use in combat zones. In combat zones, they are often used to surveille an area, damage a structures, or lethally wound a potential enemy combatant. The use of unmanned vehicles can go far beyond the aforementioned examples, especially outside of a combat zone and in a commercial setting. Businesses of all sorts are now developing innovative ways to use unmanned vehicles to benefit their business.

SUMMARY

Unmanned vehicles can be terrestrial, aerial, nautical, or multi-mode. Unmanned vehicles may be used to direct vehicle traffic in response to a vehicular accident. For example, an unmanned vehicle may analyze information about the accident scene and based on the information direct traffic near the accident scene.

In one example, a method for directing traffic via a unmanned vehicle may include receiving an alert associated with an accident of a vehicle; responsive to receiving the alert, deploying an unmanned vehicle; and directing traffic via the unmanned vehicle based on an analysis of the area associated with the accident (e.g., intersection of accident, type or severity of accident, etc.)

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
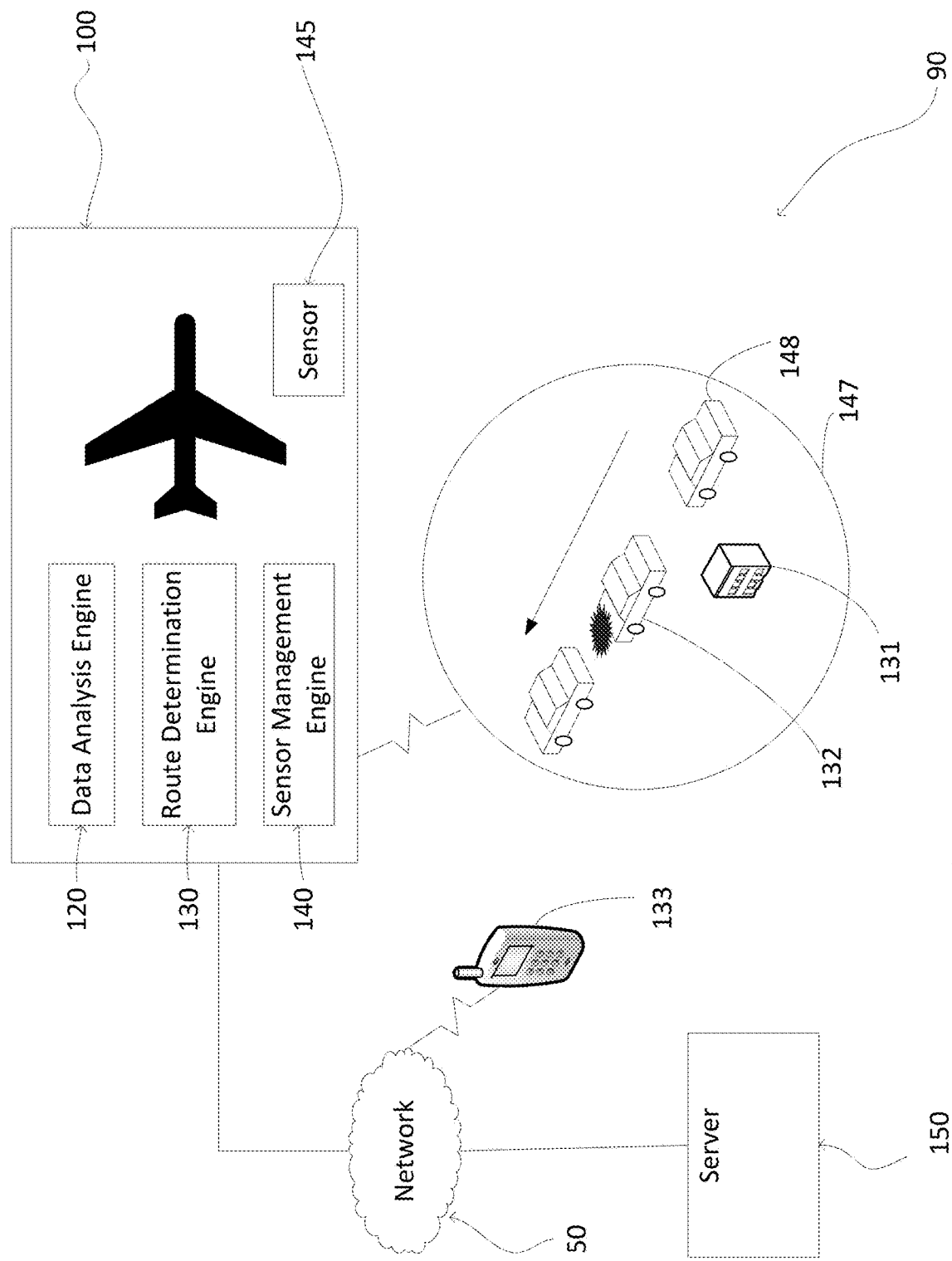
FIG. 1 illustrates an exemplary system associated with unmanned vehicle surveillance of an area.

Unmanned vehicles can be terrestrial, aerial, nautical, or multi-mode. Unmanned vehicles may be used to direct vehicle traffic in response to a vehicular accident. For example, an unmanned vehicle may analyze information about the accident scene and based on the information direct traffic near the accident scene.

Conventionally, when a car rear-ends another car in traffic, the subject car may block the flow of traffic in that lane. This fender bender or more severe accident may not only disrupt traffic at an intersection, for example, it may disrupt the flow of traffic blocks away. It may take an extended period of time for law enforcement or the like personnel to be alerted of the accident and arrive and direct traffic. Usually a person in a car crash does not have the tools, authorization, or the capability (e.g., injured driver) to divert the traffic at the time.

As discussed herein, an unmanned vehicle may be used to assist with traffic congestion or other issues that may conventionally result from a crash of one or more vehicles. It is contemplated herein that the disclosed system may be used for other events or objects that may cause traffic issues. In an example, unmanned vehicle 100 may be integrated into vehicle 132 (e.g., top of a car or headlight of a car) and may be released once a vehicle accident occurs. Unmanned vehicle 100 may be attached to any portion of vehicle 132 and may be in full view on vehicle 132 or enclosed (partially or fully) in a compartment. Unmanned vehicle 100 may draw power from vehicle 132. Unmanned vehicle 100 may be communicatively connected with systems within vehicle 132 and may be associated (e.g., based on a vehicle identification number) with vehicle 132.

Alternatively, unmanned vehicle 100 may be located at a nearby structure 131. For example, unmanned vehicle 100 may be incorporated into a nearby light pole, a nearby traffic signal, an emergency vehicle (e.g., police, fire, or ambulance), a structure that is built particularly for unmanned vehicles, or the like. In an example, unmanned vehicle 100 may gather information about the scene of the accident. The information may be from other mobile devices in the area (e.g., mobile devices of nearby motorists or pedestrians), other unmanned vehicles in the area, sensors located on the unmanned vehicle (e.g., video camera, photo camera, infrared camera, motion detectors, etc.), or the like. An unmanned vehicle may fly into the air and begin taking photos of the car crash for information and immediately process the scene of the accident. Any gathered information may be assessed all or in part locally or remotely (e.g., server 150).

Unmanned vehicle 100 may fly around an area 147 and along nearby roads, and set digital points for navigation or mapping programs (e.g., Google maps, Garmin, auto manufacturers, Siri, etc), which provide a warning that a lane is closed because of a vehicular crash or the like. Autonomous cars may immediately be communicated with by unmanned vehicle 100 or through remote server 150. The information about the accident may direct autonomous vehicles to switch over to another lane, avoid an accident area, or assist in the directing of traffic via displays on the autonomous vehicle. There may be multiple different visual alerts such as: a graphic or text displayed on a screen attached with unmanned vehicle 100; a graphic or text displayed on a screen communicatively connected with the unmanned vehicle 100 or vehicle 132; a graphic or text displayed on a screen in proximity to vehicle 132 or unmanned vehicle 100; a graphic or text displayed on a screen of mobile device 133 or vehicle 132; or a light or flashing light (e.g., strobe, rotating, vehicle signal or emergency lights) attached or communicatively connected with unmanned vehicle 100 or vehicle 132. It is contemplated that multimedia alerts (e.g., audio or video) may be communicated to devices discussed herein (e.g., in system 90).

In an example scenario, after unmanned vehicle 100 is deployed in response to an accident, unmanned vehicle 100 may travel 50 yards along a road and flash an arrow indicating to drivers to move over to the other lane. The flashing arrow or other graphic or text may be placed on a retractable surface of on unmanned vehicle 100. Unmanned vehicle 100 may know which direction to fly along the road based on an assessment of the accident scene. Unmanned vehicle 100 may also send a text message to other vehicles in area 147, such as vehicle 148 in area 147, based on an accident (or other mechanical failure) of vehicle 132. In another example, the text messages may be sent to one or more news stations or mapping program providers to alert them of the lane closure and distribute the information accordingly (e.g., news cast or update mapping program to redirect or alert users). Information collected by unmanned vehicle 100 may be used in assessment (or other determinations) of the way to effectively direct traffic (e.g., help traffic flow).

The use of unmanned vehicle 100 may expand the range of communication of an alert (e.g., SMS test message) by acting as a repeater for a device, such as mobile phone. Unmanned vehicle 100 may expand range of visual cues (e.g., flashing arrow) by communicating instructions that alter the information on billboards or other displays in an area in proximity to the accident. Proximity as discussed herein may be considered within a range to be negatively affected by the accident. This range may be a few blocks or a few miles. This negative affect may be based a threshold value of an estimated increase in travel time (e.g., 5 minutes or 25 minutes). Unmanned vehicle 100 may command traffic signals to update timing or provide visual alerts (e.g., graphics or text) for traffic signals based on its assessment of the accident or other event.

Unmanned vehicle 100 may be shared by a community of drivers. For example, unmanned vehicle 100 may be integrated into a traffic light (or positioned in other areas/structures around a geographic area) and activated and deployed for authorized vehicles to provide services discussed herein. Authorization may be based on being a customer of a particular insurance provider or other paid service. A device in a vehicle (such a mobile device of an occupant of the vehicle or integrated module) may wirelessly communicate instructions that alerts unmanned vehicle 100. The amount of unmanned vehicles 100 placed in a geographic area or the pattern of autonomous sweeps of an area by unmanned vehicles 100 may be based on history of traffic accidents in the geographic area during a particular time frame.

FIG. 1 illustrates an exemplary system 90 associated with unmanned vehicle surveillance of a property. Unmanned vehicle 100 includes sensor 145, data analysis engine 120, traffic impact engine 130, and sensor management engine 140. Unmanned vehicle 100 may be communicatively connected with network 50 and server 150. A business (e.g., an insurance provider) may own or have control of unmanned vehicle 100, network 50, or server 150. Structure 131 (e.g., may contain an unmanned vehicle) and vehicle 132 (e.g., an automobile, motorcycle, or boat) are located in area 147.

Figure 4:
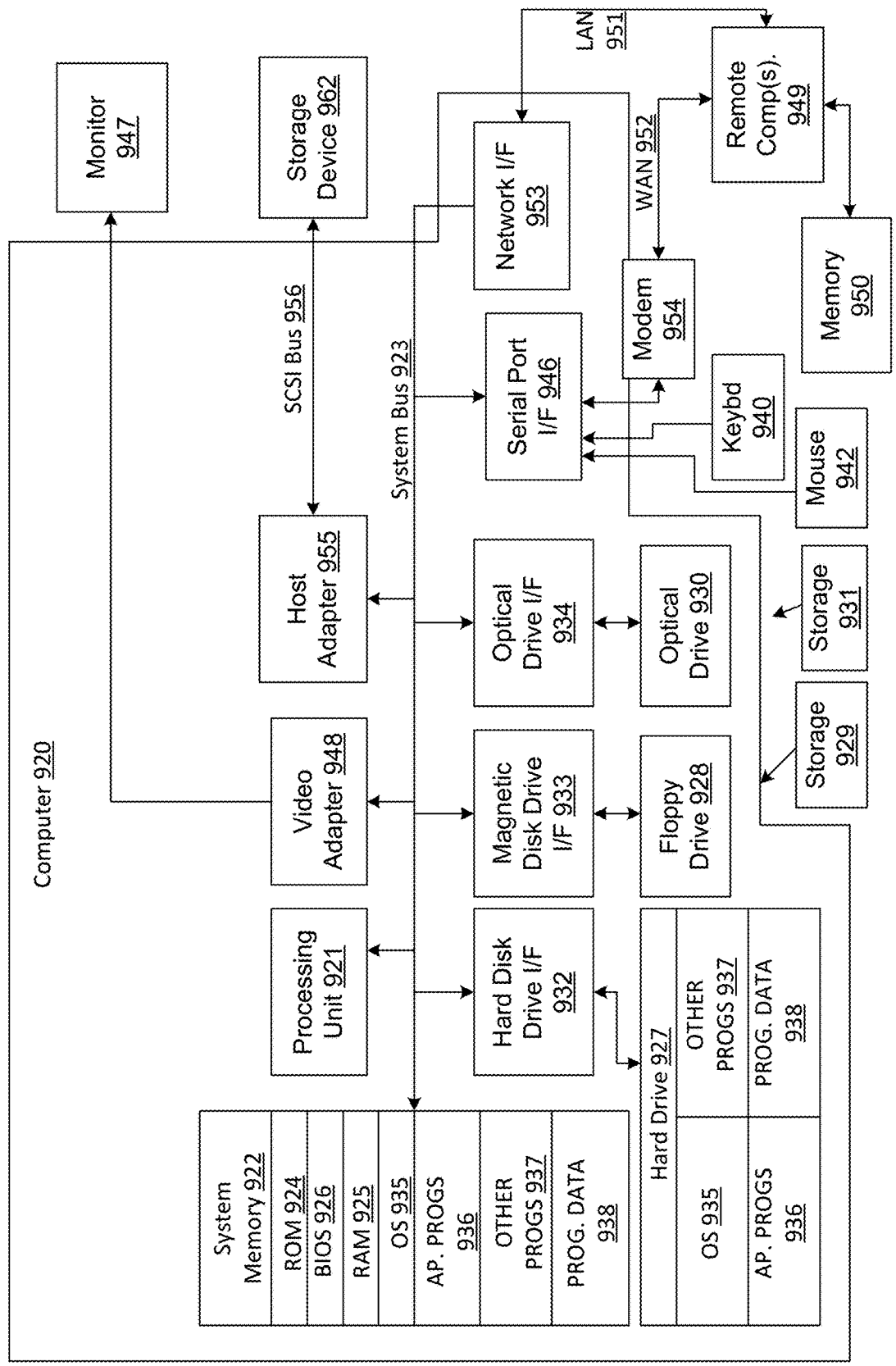
FIG. 4 is an exemplary block diagram representing a computer system in which aspects of the methods and systems disclosed herein or portions thereof may be incorporated.

With continued reference to FIG. 1, data analysis engine 120, traffic impact engine 130, and sensor management engine 140 are logical entities that may be implemented in the form of software (e.g., computer-executable instructions) stored in a memory of, and executing on a processor of unmanned vehicle 100, server 150, or another computer system such as illustrated in FIG. 4. Data analysis engine 120 may analyze data retrieved by sensor 145. Analysis by data analysis engine 120 may include comparing image data to stored coordinates to identify types of vehicles, severity of damage, visibility, weather, or the like. Traffic impact engine 130 may be utilized to determine how to direct traffic, which may include optimally redirecting vehicles to maximize traffic flow. Traffic impact engine 130 may also determine modifications to a route of unmanned vehicle 100 based on gathered data. For example, unmanned vehicle 100 may be directed to an area because a visual alert has been found to be more effective in area 147 (or an area bordering 147) or unmanned vehicle 100 should move to optimize wireless communications to devices in the area that will help direct traffic.

Sensor management engine 140 controls sensor 145. This control may include determining which sensor of a plurality of sensors are gathering data/information, the operating characteristics of said data gathering (e.g., the level of zoom of a visible light camera), where sensor 145 is aimed, or any other sensor performance control variables. It is contemplated herein that sensor 145 may include a visible light camera, an infrared camera, a microphone, a particle inspection device (e.g., a device that can detect what compounds are in sampled air gathered by unmanned vehicle 100), radar emitting/detecting device(s), a spectrometer, a hyperspectral sensor, a temperature sensor, a humidity sensor, a gas sensor, or a navigation sensor, among other things.

Figure 2:
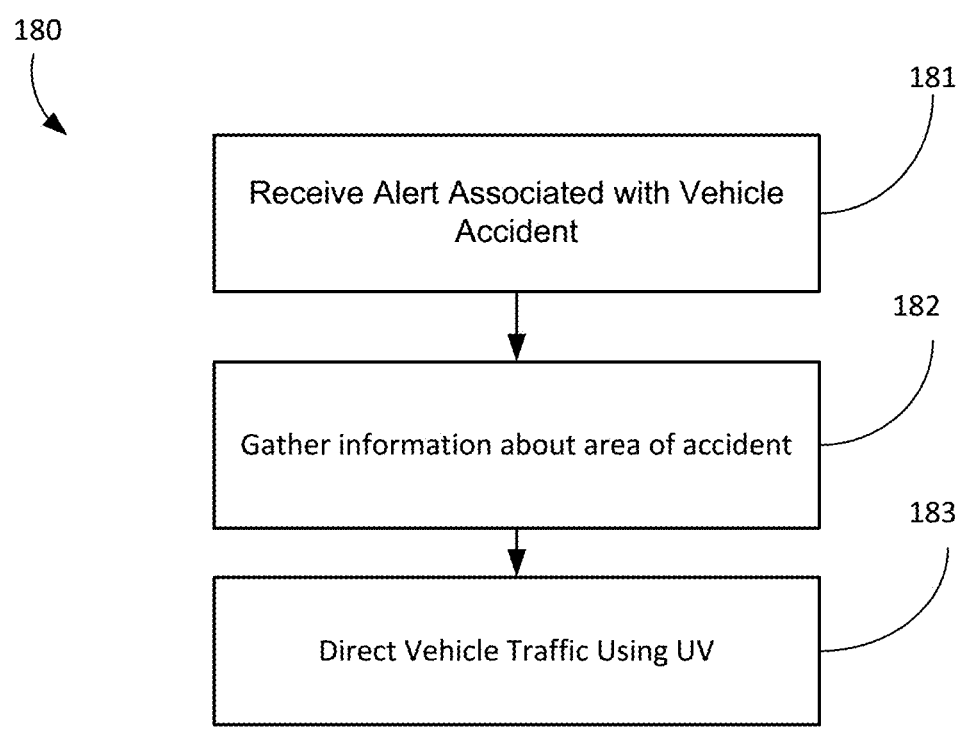
FIG. 2 illustrates an exemplary method to direct traffic with use of an unmanned vehicle.

FIG. 2 illustrates an exemplary method to direct vehicle traffic with use of an unmanned vehicle. At step 181, unmanned vehicle 100 may receive an alert associated with an accident of vehicle 132 in area 147. The alert of step 181 may include a command to activate unmanned vehicle 100, information identifying vehicle 132, GPS information, data/information (e.g., speed of vehicles, types of vehicles, etc.) from surrounding devices in or around vehicles (e.g., vehicle 148) of area 147. Some information may be received after deployment (e.g., step 182).

Figure 3:
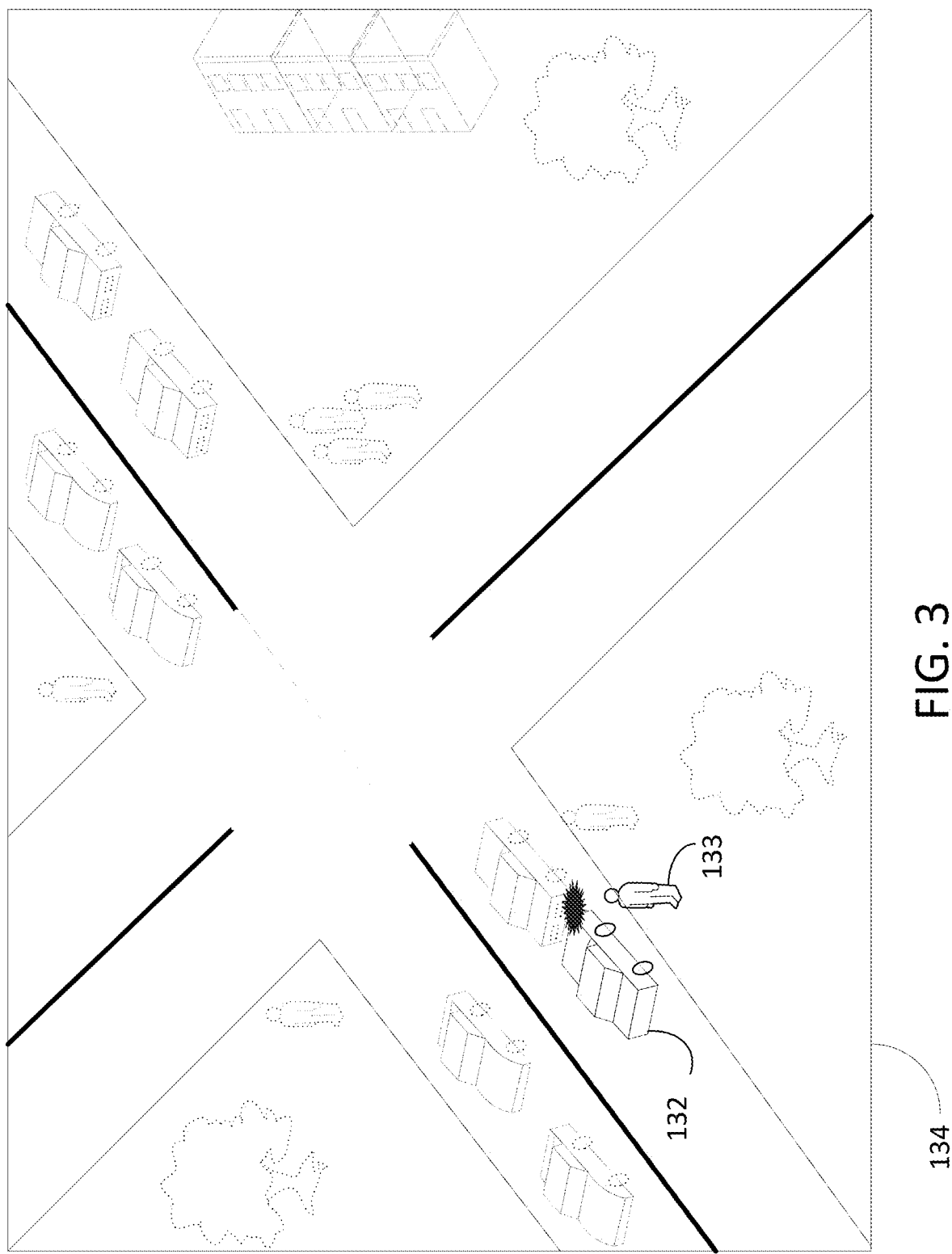
FIG. 3 illustrates an exemplary image taken by a sensor of an unmanned vehicle.

At step 182, from unmanned vehicle 100, information may be gathered and analyzed about vehicle 132, area 147, or the travel path of unmanned vehicle 100, among other things. Information about the travel path of unmanned vehicle 100 may include steepness of terrain, power lines, persons, structures, or the like and may be marked on map or used in other ways for future reference by the unmanned vehicle or an authorized user. FIG. 3 is an example of image 134 that may be captured by unmanned vehicle 100. Unmanned vehicle 100 is equipped with sensor 145 (e.g., a camera) that may be used to surveille area 146 or the travel path. Unmanned vehicle 100 may also use wireless or wired communication links to gather information from devices along the travel path (e.g., other unmanned vehicles or mobile devices along the travel path of unmanned vehicle 100) or devices of structure 131. Unmanned vehicle 100 may retrieve previous images of area 147 or travel path taken by unmanned vehicle 100 (e.g., for later comparison), or the like.

With continued reference to FIG. 2, at step 182 as stated, unmanned vehicle 100 may be deployed to gather additional information for affecting the traffic flow in area 147 or surrounding areas. Additional information may include where to send information for remote analysis (e.g., a nearby server 150 at intersection or in the cloud) or obtain information for local analysis of an accident scene (e.g., area 147). Additional information may include the severity of the accident (e.g., life threatening or fender bender), location and state of driver (e.g., passed out or standing), or whether 911 or associated authorities have been alerted about accident. Additional information may include identity of witnesses (e.g., facial recognition/license plate lookup—for providing statements to be retrieved later), speed of nearby vehicles, communication methods of nearby devices (e.g., Bluetooth, WiFI, Cellular—for determining type and manner of alerting), or the like.

At step 183, unmanned vehicle 100 may direct vehicle traffic based on the information gathered in step 181 or step 182. Directing of traffic with the assistance of unmanned vehicle 100 may take multiple forms. Unmanned vehicle 100 may identify the surrounding vehicles and target communications to them. Identification could be before or after the accident. Unmanned vehicle 100 may anticipate telling which users/drivers when lanes will be stopped/diverted/alerted to move. Autonomous or other vehicles may be alerted to slow down or be cautious for certain radius around accident. If EMT or other emergency vehicles (e.g., police or fire) are in route to the accident in area 147, unmanned vehicle may alert vehicles in the way (between the emergency vehicle and the accident) that EMS is arriving for a particular vehicle at a particular location. This may assist in vehicles proactively pulling over in anticipation of an emergency vehicle. A map may be displayed to a device associated with a user of the device/vehicle. The map may include the position of the emergency vehicle and the vehicle of the user in traffic. The emergency vehicle or mobile devices associated with emergency personnel may be provided a map of vehicle positions (e.g., particularly occupied and unoccupied lanes) so the emergency vehicle can efficiently navigate traffic to arrive at the accident in area 147. Unmanned vehicle 100 may assist in clearing a path for the emergency vehicle en route to the accident in area 147. Whether a vehicle is en route may be based on examining GPS coordinates associated with the emergency vehicle.

With continued reference to step 183 of FIG. 2, unmanned vehicle 100 may provide an alert (e.g., text message or pre-recorded message) to nearby vehicles that indicates that an emergency related contact (e.g., 911 phone call, 911 text, etc.) was already contacted or emergency personnel was alerted of the accident in area 147 and that assistance is on the way. Unmanned vehicle 100 may need to determine which vehicles have drivers and plan to maneuver around the accident and which drivers have exited their vehicles to assist a victim so unmanned vehicle 100 may can effectively direct traffic. Unmanned vehicle 100 may determine that it should disregard some vehicles when attempting to direct traffic by analyzing information, such as whether a vehicle door is open, whether there is a person present in a non-autonomous vehicle, whether the vehicle is an emergency vehicle, whether the mobile device 133 is wirelessly paired with a vehicle, and the like.

As discussed, an unmanned vehicle and other devices may assist in directing traffic during accidents. Herein are several different examples associated with a traffic drone system, as discussed herein. It is contemplated herein that methods, components, or the like of each example may be reasonably integrated with or removed from other examples discussed herein. Although directing traffic associated with a vehicular accident is discussed, it is also contemplated that traffic may be directed for other reasons, such as directing traffic for an emergency vehicle headed to a scene of a crime or other emergency. In this example, the unmanned vehicle is associated with an emergency vehicle and may fly ahead to clear the path for the emergency vehicle. Additional examples are discussed below. In an example, an unmanned vehicle 100 may identify boundary lines where a vehicle may lose control within a distance (e.g., nearby icy intersection) and provide a message to the vehicle of that potential disablement event. In an example, multiple unmanned vehicles may be used to triangulate location of vehicles, the type of injuries sustained by a person, and the like. In an example, unmanned vehicle 100 may be used to redirect other unmanned vehicles (e.g., redirect news or civilian unmanned vehicles from an area). In an example, authorities may take control of unmanned vehicle 100 to do such things as, flying it, moving it, or adjusting video feed.

In an example, unmanned vehicle 100 may be immediately activated and immediately gather information when a collision or intrusion (e.g., unauthorized vehicle entry) is detected. This immediate activation may assist in situations where there is a hit and run. For the hit and run scenario, unmanned vehicle 100 may lock onto a vehicle or a person and follow it. While following the person or vehicle that is suspected of causing the collision or intrusion, unmanned vehicle 100 may take pictures and record other information (maybe through use of a wireless protocol), such as device IDs of any devices associated with the suspected person or vehicle.

In another example, unmanned vehicle 100 sends data to server 150 and server 150 deletes sensitive data (e.g., images of people). It is further contemplated herein that server 150 may act in coordination with a plurality of providers, and server 150 may forward on to each provider, data that is associated with an insurance claim that has been or may be made against a policy associated with that provider. In this example, a single entity (e.g., a neutral party or a government affiliated party) organizes or is involved in the deployment of unmanned vehicle 100, and a provider interacts with that single entity to obtain information to which the provider is entitled.

In another example, data is streamed via LTE, Wi-Fi, or any networking means as would be recognized. In another example, data is streamed via one or more unmanned vehicles 100 communicating or relaying information to a communication station for one another.

In another example, a plurality of unmanned vehicles 100 may be assigned to a single airspace that is related to or is over the site of an event such as a widespread disaster.

In another example, a plurality of unmanned vehicles 100 are assigned to a plurality of airspaces that may be assigned, and said airspaces may be exclusive of each other (or they may not be exclusive of each other). It is contemplated herein that airspaces may be exclusive of each other via geographical coordinates (e.g., the x-axis or the y-axis) or via altitude (e.g., the z-axis).

In another example, a request message is sent to an insured to ask permission for unmanned vehicle 100 to deploy at or near (proximate to) property owned by the insured so as to enable or facilitate unmanned vehicle 100 to gather data about a property (e.g., vehicle 148 or vehicle 132) of the insured.

In another example, unmanned vehicle 100 may provide cell phone or satellite phone uplink. Also unmanned vehicle 100 may operate as a repeater for a mobile phone or satellite data or voice. It is contemplated herein that multiple unmanned vehicles 100 may be daisy chained together to provide communication service to mobile phones, among other things. Unmanned vehicle 100 may provide network connectivity, such as cell phone tower (e.g., by imitating a cell phone tower) or a Wi-Fi base station.

In another example, unmanned vehicle 100 may include video streaming functionality. For example, if a claim is initiated by or on behalf of an insured, an unmanned vehicle 100 may be deployed to the insured and the insured may utilize unmanned vehicle 100 to perform video or audio communications with server 150.

The present disclosure is directed to a drone traffic system. The present disclosure is not limited in any way to the examples, which can be applicable in various forms, as appreciated by one skilled in the art. Therefore, it is to be understood that any terms, phrases, structural and functional details, disclosed herein are merely a basis for the claims and as a representative for teaching one skilled in the art to variously employ the present disclosure.

Unless defined otherwise, all technical and scientific terms used herein have the same meaning as commonly understood. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known, and so forth.

The disclosure is not to be limited by what has been particularly shown and described, except as indicated by the appended claims. Further, although at least one series of steps are presented as an exemplary method of practicing one or more examples described herein, it will be appreciated that the steps identified may be practiced in any order that is practicable, including without limitation the omission of one or more steps.

It is to be appreciated that network 50 depicted in FIG. 1, for example, may include a local area network (LAN), a wide area network (WAN), a personal area network (PAN), or combinations thereof. Such networking environments are commonplace in offices, enterprise-wide computer networks, intranets, and the Internet. For instance, when used in a LAN networking environment, system 90 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 90, or portions thereof, may be stored in a remote memory storage device such as storage medium. Computing devices may communicate over network 50 through one or more communications links 75 formed between data interfaces. Communication links 75 may comprise either wired or wireless links. It is to be appreciated that the illustrated network connections in the figures (e.g., FIG. 1 or FIG. 4) are exemplary and other ways of establishing a communications link between multiple devices may be used.

FIG. 4 and the following discussion are intended to provide a brief general description of a suitable computing environment in which the methods and systems disclosed herein or portions thereof may be implemented. Although not required, the methods and systems disclosed herein is described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices.

FIG. 4 is a block diagram representing a general purpose computer system in which aspects of the methods and systems disclosed herein and/or portions thereof may be incorporated. As shown, the exemplary general purpose computing system includes a computer 920 or the like, including a processing unit 921, a system memory 922, and a system bus 923 that couples various system components including the system memory to the processing unit 921. The system bus 923 may be any of several types of bus structures including a memory bus or memory controller, a peripheral bus, and a local bus using any of a variety of bus architectures. The system memory includes read-only memory (ROM) 924 and random access memory (RAM) 925. A basic input/output system 926 (BIOS), containing the basic routines that help to transfer information between elements within the computer 920, such as during start-up, is stored in ROM 924.

The computer 920 may further include a hard disk drive 927 for reading from and writing to a hard disk (not shown), a magnetic disk drive 928 for reading from or writing to a removable magnetic disk 929, and an optical disk drive 930 for reading from or writing to a removable optical disk 931 such as a CD-ROM or other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide non-volatile storage of computer readable instructions, data structures, program modules and other data for the computer 920. As described herein, computer-readable media is a tangible, physical, and concrete article of manufacture and thus not a signal per se.

Although the exemplary environment described herein employs a hard disk, a removable magnetic disk 929, and a removable optical disk 931, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 929, optical disk 931, ROM 924 or RAM 925, including an operating system 935, one or more application programs 936, other program modules 937 and program data 938. A user may enter commands and information into the computer 920 through input devices such as a keyboard 940 and pointing device 942. Other input devices (not shown) may include a microphone, joystick, game pad, satellite disk, scanner, or the like. These and other input devices are often connected to the processing unit 921 through a serial port interface 946 that is coupled to the system bus, but may be connected by other interfaces, such as a parallel port, game port, or universal serial bus (USB). A monitor 947 or other type of display device is also connected to the system bus 923 via an interface, such as a video adapter 948. In addition to the monitor 947, a computer may include other peripheral output devices (not shown), such as speakers and printers. The exemplary system of FIG. 4 also includes a host adapter 955, a Small Computer System Interface (SCSI) bus 956, and an external storage device 962 connected to the SCSI bus 956.

The computer 920 may operate in a networked environment using logical connections to one or more remote computers, such as a remote computer 949. The remote computer 949 may be a personal computer, a server, a router, a network PC, a peer device or other common network node, and may include many or all of the elements described above relative to the computer 920, although only a memory storage device 950 has been illustrated in FIG. 4. The logical connections depicted in FIG. 4 include a local area network (LAN) 951 and a wide area network (WAN) 952. Such networking environments are commonplace in offices, enterprise-wide computer networks, intranets, and the Internet.

When used in a LAN networking environment, the computer 920 is connected to the LAN 951 through a network interface or adapter 953. When used in a WAN networking environment, the computer 920 may include a modem 954 or other means for establishing communications over the wide area network 952, such as the Internet. The modem 954, which may be internal or external, is connected to the system bus 923 via the serial port interface 946. In a networked environment, program modules depicted relative to the computer 920, or portions thereof, may be stored in the remote memory storage device. It will be appreciated that the network connections shown are exemplary and other means of establishing a communications link between the computers may be used.

Computer 920 may include a variety of computer readable storage media. Computer readable storage media can be any available media that can be accessed by computer 920 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 920. Combinations of any of the above should also be included within the scope of computer readable media that may be used to store source code for implementing the methods and systems described herein. Any combination of the features or elements disclosed herein may be used in one or more examples.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur. Such other examples are intended to be within the scope of the claims if they have structural elements that do not differ from the literal language of the claims, or if they include equivalent structural elements with insubstantial differences from the literal languages of the claims.

What is claimed is:

1. An unmanned vehicle comprising:
a processor; and
a memory coupled with the processor, the memory comprising executable instructions that when executed by the processor cause the processor to effectuate operations comprising:
receiving, from a device, an alert associated with an accident of a vehicle, wherein the device comprises a communication module of the vehicle;
responsive to receiving the alert, deploying to a location of the accident;
receiving, at the location of the accident, data from one or more vehicles; and
providing instructions, based at least on the data, for directing traffic, wherein the instructions for directing traffic comprises instructions communicated wirelessly to a traffic control device at the location of the accident of the vehicle.

2. The unmanned vehicle of claim 1, wherein the operations further comprise sending, via a text telecommunications message, a notification to a plurality of mobile devices.

3. The unmanned vehicle of claim 2, wherein the instructions are based on determining that an emergency vehicle is en route to the accident.

4. The unmanned vehicle of claim 2, wherein the operations further comprise outputting visual cues associated with directing traffic.

5. The unmanned vehicle of claim 1, wherein the instructions for directing traffic comprise instructions to display visual alerts.

6. The unmanned vehicle of claim 1, wherein the instructions for directing traffic comprise instructions to display visual alerts, wherein the visual alerts comprise a graphic or text displayed on a screen attached with the unmanned vehicle.

7. The unmanned vehicle of claim 1, wherein the instructions for directing traffic comprise instructions to display visual alerts, the displayed virtual alerts comprise a graphic or text displayed on a screen communicatively connected with the unmanned vehicle.

8. The unmanned vehicle of claim 1, wherein the instructions for directing traffic comprise instructions to display visual alerts.

9. The unmanned vehicle of claim 1, wherein the instructions for directing traffic comprise instructions to display visual alerts, the visual alerts comprise a graphic or text displayed on a screen.

10. The unmanned vehicle of claim 1, wherein the instructions for directing traffic comprise instructions to display visual alerts, the visual alerts comprise a graphic or text displayed on a screen.

11. The unmanned vehicle of claim 2, wherein the instructions for directing traffic comprise instructions to display visual alerts, the visual alerts comprise multimedia displayed on each screen of the plurality of mobile devices.

12. The unmanned vehicle of claim 1, wherein the instructions for directing traffic comprise instructions to display visual alerts, the visual alerts comprise a flashing light attached or communicatively connected with the unmanned vehicle.

13. The unmanned vehicle of claim 1, wherein the instructions for directing traffic comprise instructions that change functions of traffic signals.

14. The unmanned vehicle of claim 1, wherein the instructions for directing traffic are further based on historical traffic flows proximate to the accident.

15. The unmanned vehicle of claim 1, wherein the instructions for directing traffic are further based on determining that an emergency vehicle is proximate to the accident.

16. The unmanned vehicle of claim 1, wherein the instructions for directing traffic comprise instructions for an autonomous vehicle to change lanes.

17. The unmanned vehicle of claim 1, wherein the unmanned vehicle is deployed from the vehicle that had the accident.

18. A device comprising:
a processor; and
a memory coupled with the processor, the memory comprising executable instructions that when executed by the processor cause the processor to effectuate operations comprising:
receiving, from an integrated device, an alert associated with an accident of a vehicle, wherein the integrated device is configured to communicate with the vehicle;
responsive to receiving the alert, providing instructions to deploy an unmanned vehicle to a location of the accident;
receiving, from the unmanned vehicle at the location of the accident, data from one or more vehicles; and
providing, via the unmanned vehicle and based at least on the data, instructions for directing traffic, wherein the instructions for directing traffic comprises instructions communicated wirelessly to a traffic control device at the location of the accident of the vehicle.

19. The device of claim 18, wherein the instructions for directing traffic are further based on determining that an emergency vehicle is en route to the accident.

20. A method comprising:
receiving, from a device configured to communicate with a vehicle, an alert associated with an accident of the vehicle;
responsive to receiving the alert, providing instructions to deploy an unmanned vehicle to a location of the accident;
receiving, by the unmanned vehicle at the location of the accident, data from one or more vehicles; and
providing, by the unmanned vehicle and based at least on the data, instructions for directing traffic, wherein the instructions for directing traffic comprises instructions communicated wirelessly to a traffic control device at the location of the accident of the vehicle.

* * * * *